United States Patent [19]

Boutcher, Jr.

[11] Patent Number: 4,837,926

[45] Date of Patent: Jun. 13, 1989

[54] WORK HOLDER FOR ELECTRICAL CONNECTORS

[75] Inventor: Andrew G. Boutcher, Jr., Harrisburg, Pa.

[73] Assignee: AMP Incorporated, Harrisburg, Pa.

[21] Appl. No.: 200,334

[22] Filed: May 31, 1988

[51] Int. Cl.[4] .............................................. B23P 19/02

[52] U.S. Cl. ........................................ 29/747; 29/748; 29/754; 269/903; 269/43

[58] Field of Search ................. 29/747, 748, 749, 754, 29/453, 281.1, 281.5; 269/43, 238, 903

[56] References Cited

U.S. PATENT DOCUMENTS

| | | | |
|---|---|---|---|
| 3,797,090 | 3/1974 | Boutcher et al. | 29/747 |
| 4,139,937 | 2/1979 | L'Homme | 29/748 |
| 4,754,536 | 7/1988 | Goyert | 29/748 |

*Primary Examiner*—P. W. Echols

*Assistant Examiner*—R. Jordan

*Attorney, Agent, or Firm*—James M. Trygg; Frederick W. Raring

[57] ABSTRACT

Work holder for holding electrical connectors during insertion of terminals into cavities in the connector comprises a positioning fixture and a clamping member. The connector is clamped between one face of the positioning fixture and the clamping member. The positioning fixture has terminal guiding openings extending therethrough and has aligning and guiding surface portions which guide the connector towards these openings when the connector is being clamped in the fixture so that the cavities in the connector are in precise alignment with the terminal guiding openings. The fixture is intended for use in a robot and permits reorientation of the connector, from right to left, so that connectors requiring terminals in two different orientations can be accommodated.

16 Claims, 9 Drawing Sheets

WORK HOLDER FOR ELECTRICAL · CONNECTORS

FIELD OF THE INVENTION

This invention relates to work holders and particularly to work holders intended for holding electrical connectors during the performance of operations thereon such as the assembly of electrical terminals to the connector.

BACKGROUND OF THE INVENTION

A widely used type of electrical connector comprises a molded plastic housing having a plurality of terminal receiving cavities extending into one of its faces. The cavities and the terminals which are inserted into the cavities have interengaging means for retaining the terminals within the cavities after insertion. The interengaging means commonly comprises a lance on the terminal and a shoulder in the cavity against which the lance bears after insertion. Insertion thus merely requires that the terminal be moved into the cavity until the terminal lance engages the cavity shoulder. The insertion operation is usually carried out by hand, although some automatic insertion machines can be used under some circumstances. U.S. application Ser. No. 154,745, filed Feb. 10, 1988 describes an insertion apparatus which is capable of picking up individual terminals which have been crimped onto wires and moving the terminals along a precisely predetermined path so that if the housing is located on the path, the terminal will be inserted into a cavity in the housing.

It is essential, in automatic insertion operations, that the connector housing be precisely located relative to the path of movement of terminal in order that the terminal will move into the cavity and will not be moved against the surface of the housing. Additionally, it is necessary to index or move the housing after each insertion operation and bring a vacant cavity in the housing into alignment with the terminal insertion apparatus. In some instances, there is a further complication in that the housing may be provided with two or more rows of cavities which require the terminals in one row to be in one orientation and the terminals in the other row to be in a second orientation. Under such circumstances, the housing must be reoriented after the cavities in the one row have been filled. It will thus be apparent that the requirements for an electrical connector work holder go far beyond the requirements of a relatively simple static work holder which is intended to support a part while a single operation is being performed thereon such as a drilling operation.

The present invention is directed to the achievement of an improved work holder for electrical connectors which is intended for use with a robotic device and which is capable of holding an electrical connector, or a pluarlity of electrical connectors, in a predetermined position while terminals are inserted into the cavities of the connector. The invention is further directed to the achievement of a work holder which is capable of picking up a connector which has been delivered to a loading station, transporting the connector to a terminal insertion station, reorienting the connetor at the insertion station, and indexing (in cooperation with a robot) the position of the connector to bring the cavities therein into alignment with an insertion apparatus.

THE INVENTION

The invention can be briefly and comprehensively described as follows.

The invention comprises a work holder for holding an electrical connector housing during insertion of terminals into terminal receiving cavities in the housing. The housing has oppositely directed first and second faces, the terminal receiving cavities extending inwardly from the first face. The work holder comprises a housing positioning fixture having oppositely directed first and second major fixture surfaces. A plurality of terminal guiding openings extends through the positioning fixture at locations conforming to the locations of the cavities in the housing. A clamping member is provided and is located in spaced aligned relationship to the first major fixture surface. The clamping member and the positioning fixture are movable relatively towards and away from each other between opened and closed positions, the clamping member and the positioning fixture being spaced apart by a distance sufficient to permit placement of the housing therebetween with the first face opposed to the first major fixture surface when the plate and the clamping means are in their open positions. The housing is clamped between the clamping member and the positioning fixture with the first face adjacent to the first major fixture surface when the clamping member and the positioning fixture are in their closed positions. Clamp actuating means are provided for moving the positioning member and the clamping fixture between their open and closed positions and guiding and aligning means are provided on the first major fixture surface for guiding and aligning the first face of a housing such that the cavities in the housing are aligned with the terminal guiding openings when the housing is clamped in the fixture. The guiding and aligning means comprises separate guiding surface portions and aligning surface portions. The guiding surface portions extend from the major fixture surface and are effectively to guide the housing towards the first major fixture surface when the clamping member and the positioning fixture are moving towards their closed positions. The aligning surface portions extend obliquely from the first major fixture surface to the guiding surface portions and are effectively precisely to align the cavities with the terminal guiding openings by shifting the housing laterally where required with respect to the first major fixture surface.

A connector housing will commonly have external walls which extend from the first face to the second face and have edges at the intersections of the first face and the external walls. One embodiment of the work holder is characterized in that the housing edges are moved against the obliquely extending aligning surface portions of the aligning means during movement of the positioning fixture and the clamping member to their closed positions. The guiding surface portions in the preferred embodiment extend normally of the first major fixture surface.

A preferred embodiment of the invention also has rotary actuator means thereon on which the clamping member and the positioning fixture are supported. The rotary actuating means is capable of moving the housing clamped in the fixture along a circular path so that the fixture can be reoriented with respect to an insertion apparatus with which it is being used.

THE DRAWING FIGURES

Figure 5:
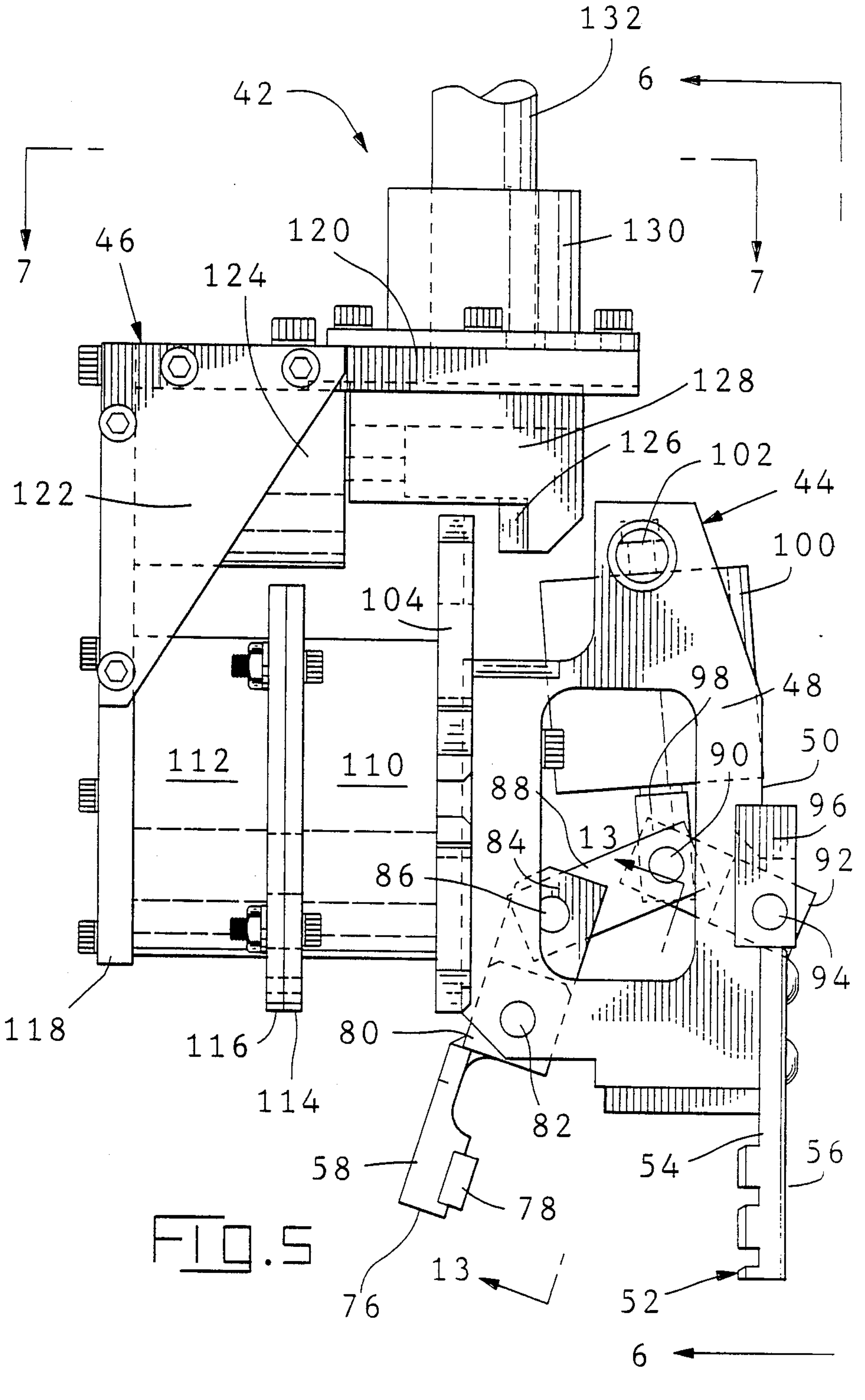
FIG. 5 is a side view of a work holder assembly in accordance with the invention.
Figure 6:
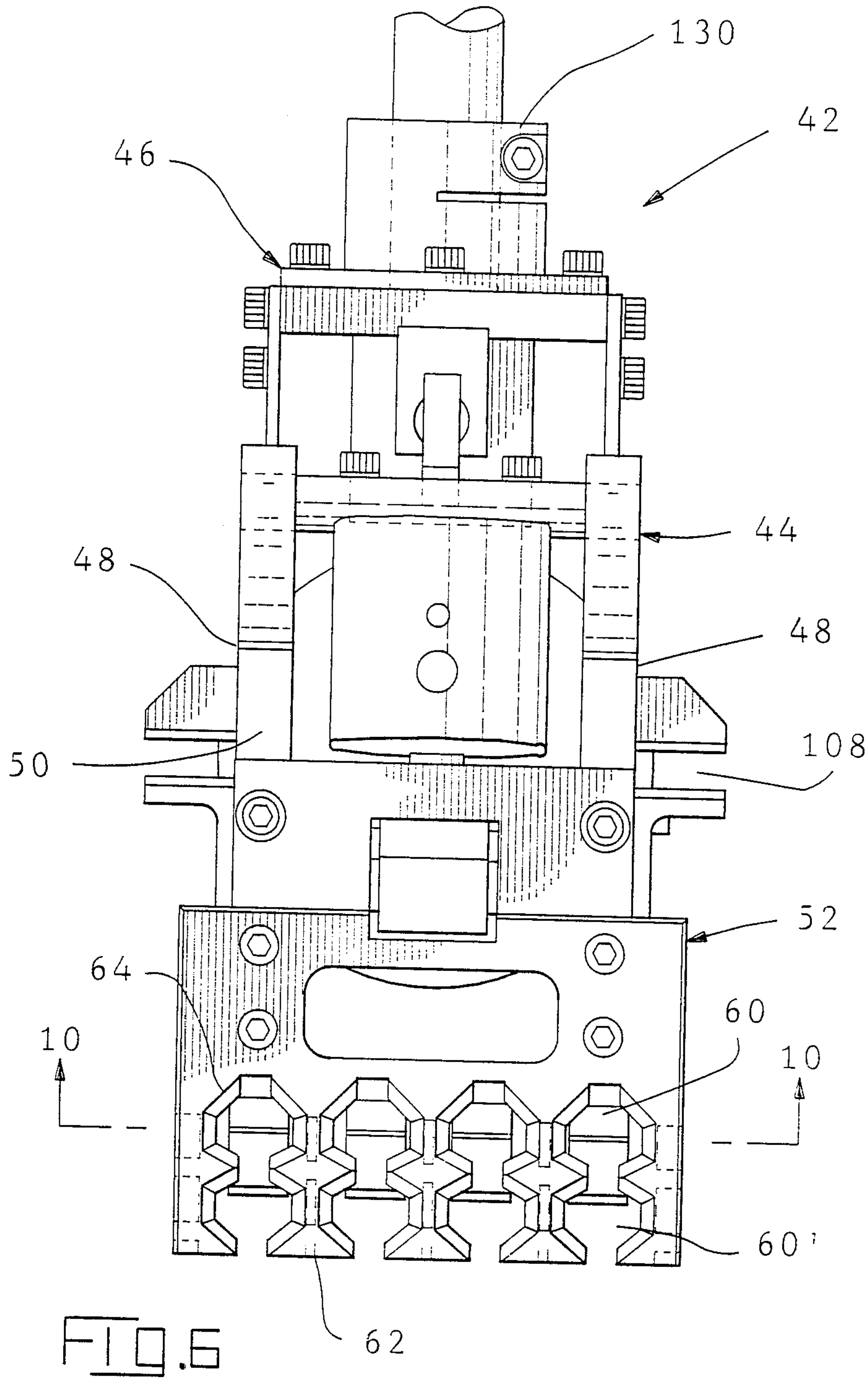
Figure 7:
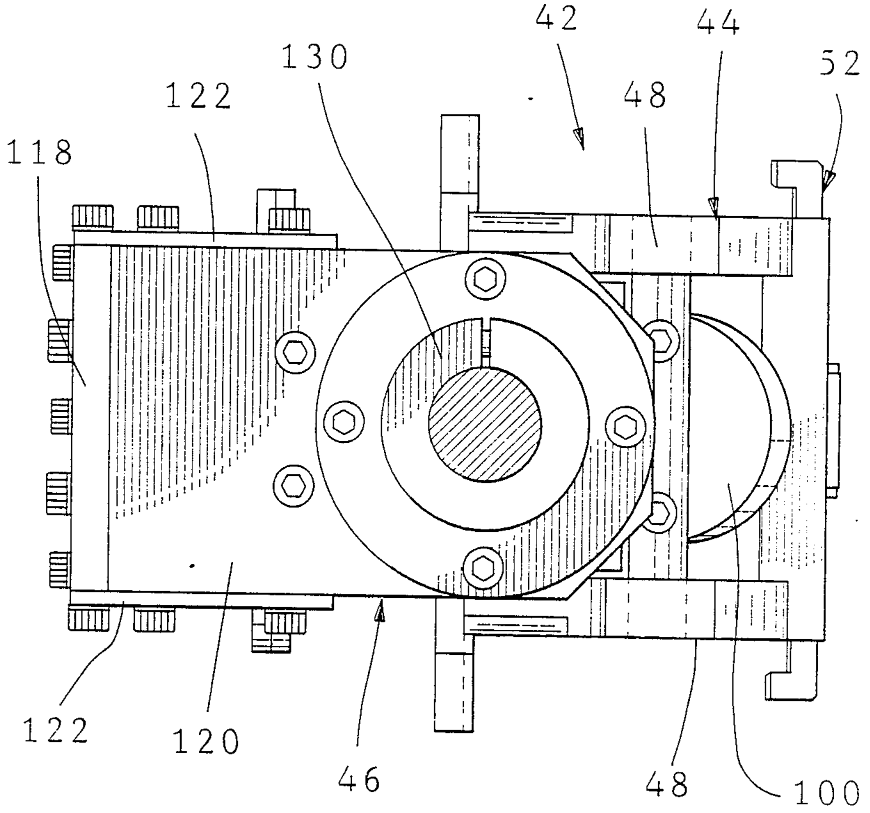

FIGS. 6 and 7 are views looking in the direction of the arrows 6—6 and 7—7 of FIG. 5.

Figure 8:
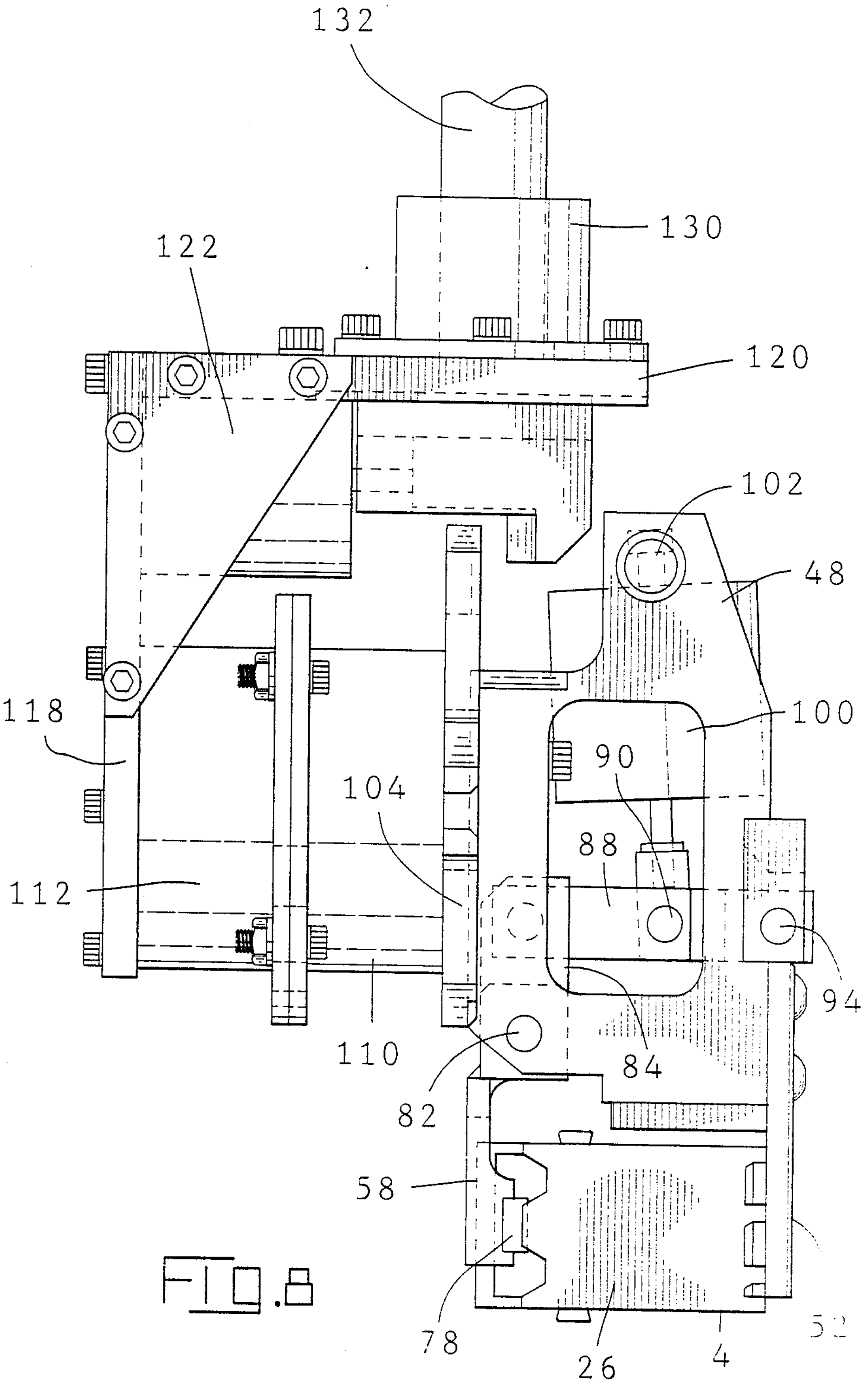

FIG. 8 is a view similar to FIG. 5 but showing the positions of the parts when connector housings are clamped in the work holder.

Figure 9:
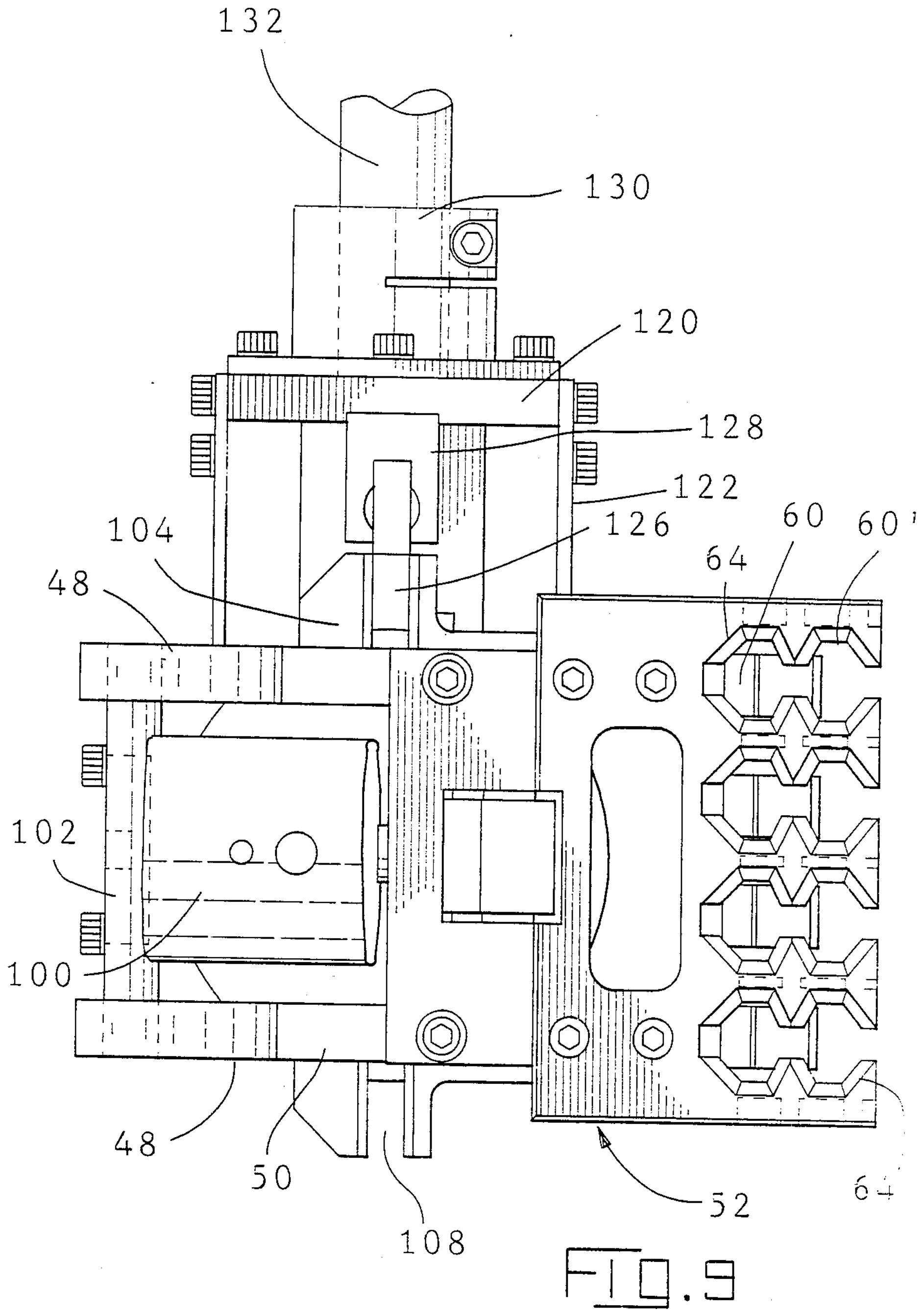

FIG. 9 is a view similar to FIG. 6 but showing the positions of the parts when the work holder has positioned the connectors clamped therein in an orientation such that terminals can be inserted into one of the rows of cavities in the connetors.

Figure 10:
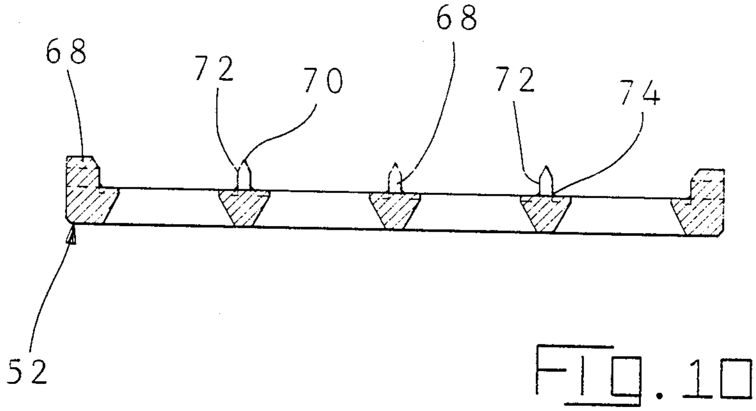

FIG. 10 is a sectional view looking in the direction of the arrows 10—10 of FIG. 6.

Figure 11:
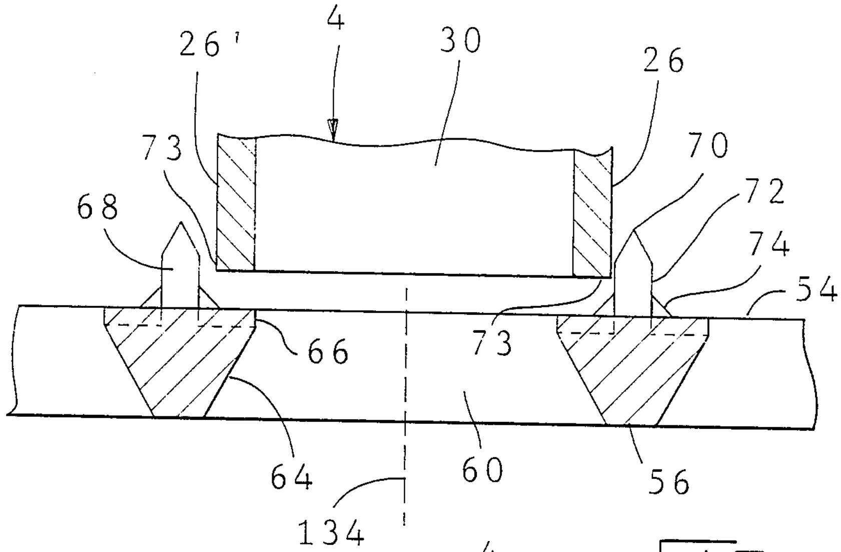

FIG. 11 is a fragmentary view similar to FIG. 10 and on an enlarged scale which shows the guiding and aligning means on the positioning fixture.

Figure 12:
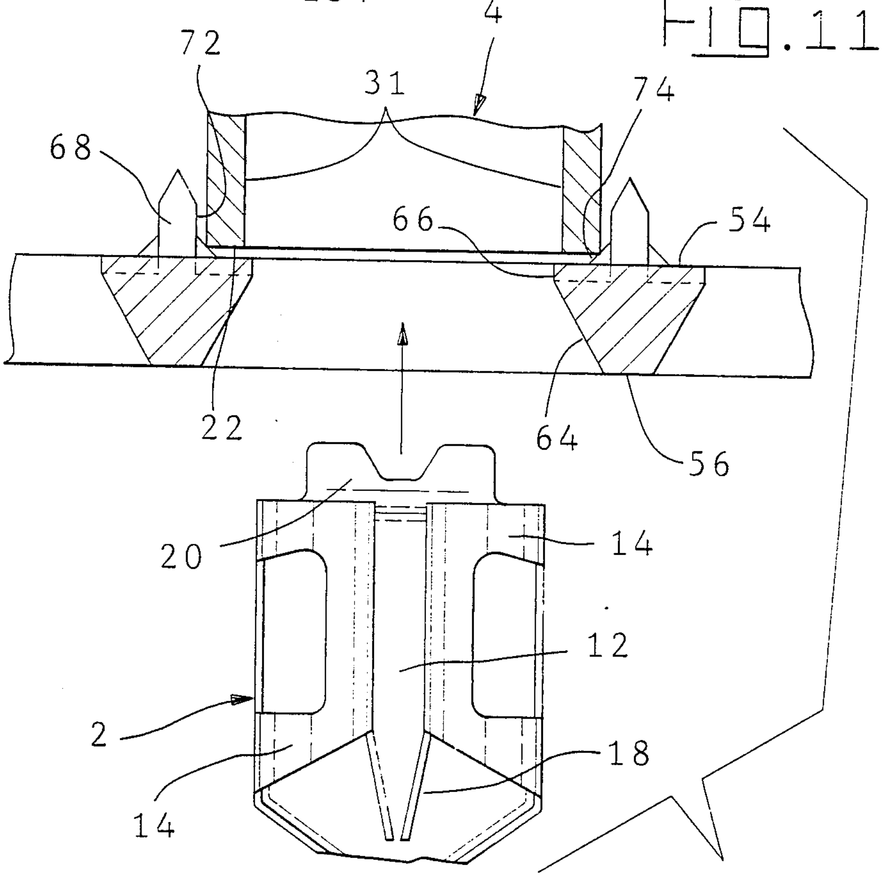

FIG. 12 is a view similar to FIG. 11 but showing a connector housing positioned on the positioning fixture with the connector cavity in alignment with an opening in the fixture.

Figure 13:
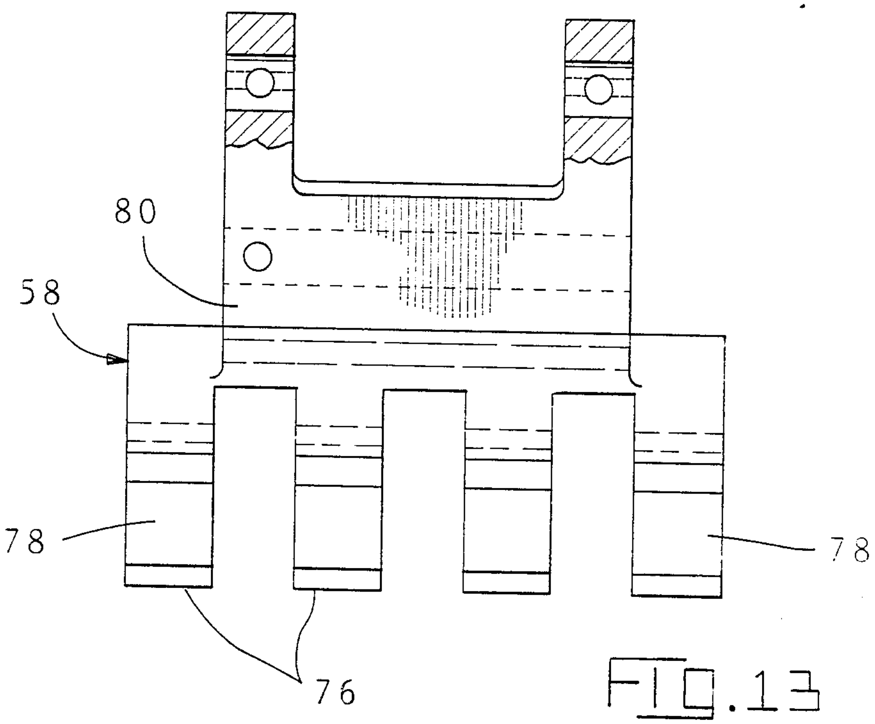

FIG. 13 is a view showing the clamping member looking in the direction of the arrows 13—13 of FIG. 5.

FIG. 14 is a plan view of the positioning plute.

THE DISCLOSED EMBODIMENT

The disclosed embodiment is intended to hold a plurality of connector housing 4 while terminals 2 are inserted into cavities in the connector. Each terminal comprises a receptacle portion and is crimped as shown at 8 onto a wire 10. The receptacle portion 6 comprises a flat web 12 having curled sides 14 which extends inwardly and downwardly so that their edges 16 are adjacent to, and spaced from, the surfafe of the web 12. Terminals of the type shown are intended to receive a flat tab having a rectangular cross-section. Retaining lances 18 extend from the trailing edges of the curled sides 14 and a tongue 20 extends laterally from the forward end of the web for anchoring or locating the terminal in its cavity.

Figure 1:
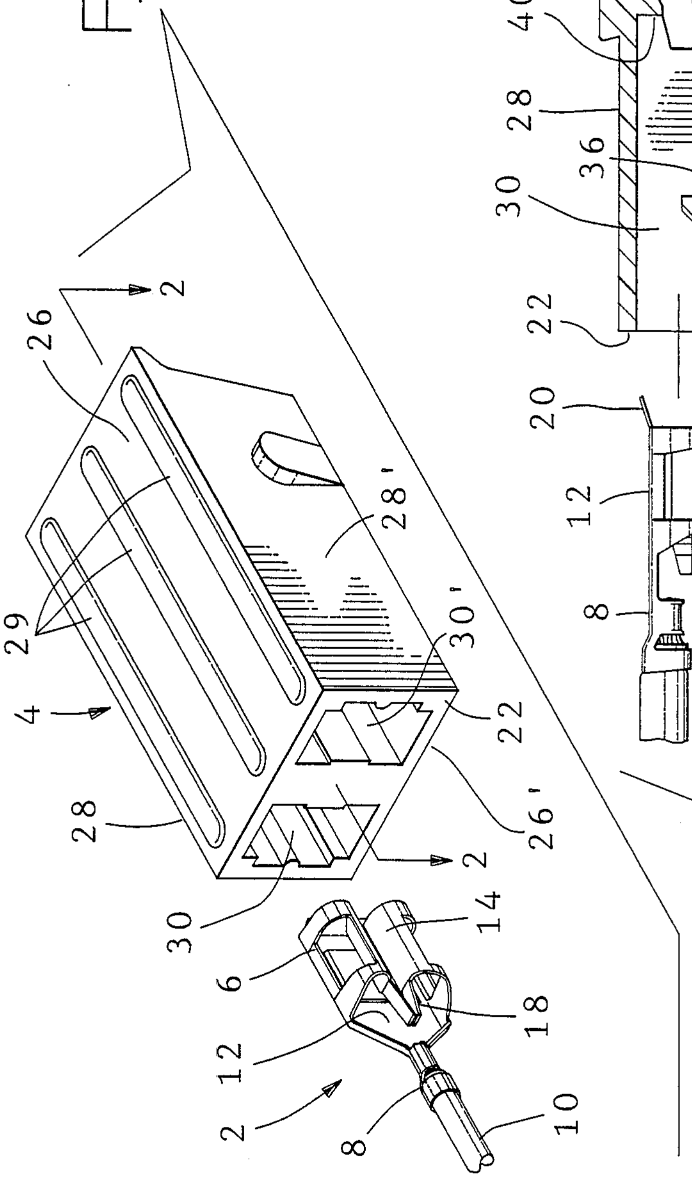
FIG. 1 is a perspective view showing an electrical connector and showing terminals in alignment with the cavities in the connector.
Figure 2:
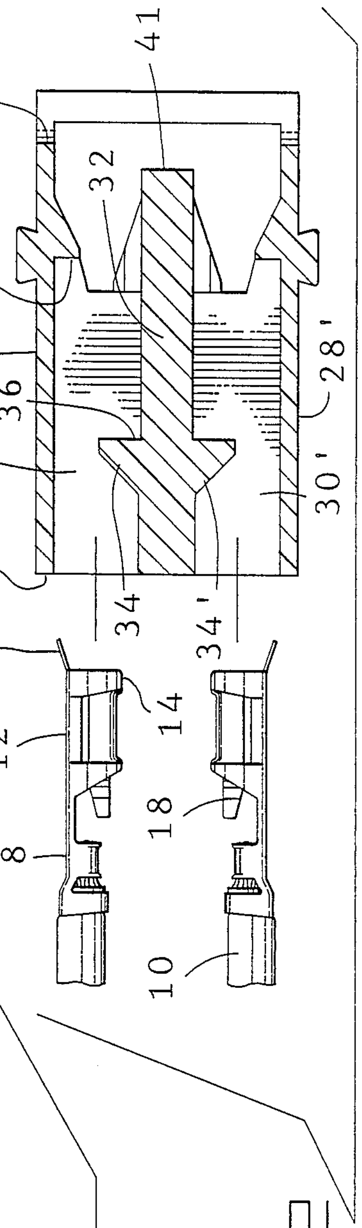
FIG. 2 is a cross-sectional view of the connector housing looking in the direction of the arrows 2—2 of FIG. 1.

The housing 4 is of molded plastic material and has a first or terminal receiving face 22 and a second face 24. External side walls 26, 26' and oppositely facing external end walls 28, 28' extend between the two faces. Two side-by-side cavities 30, 30' extend through the housing and are separated by a central barrier wall 32. Ears are provided in each cavity and extended from the barrier wall as shown at 34, 34'. These ears provide shoulders 36 which are engaged by the ends of the lances 18 when the terminals are fully inserted into the cavities. A forward stop for the terminal is provided in each cavity as shown at 40. It should be noted that the barrier wall 32 of the housing has a flat centrally located surface 41 at the second face of the housing. This surface is engaged by a clamping member when the connector is positioned in the work holder as will be described below. The upper (as viewed in FIG. 1) sidewall 26 has ribs 29 thereon which extend between the faces 22, 24. Ribs of this type are sometimes provided for polrizing or keying purposes.

A work holder assembly 42, FIGS. 5-7, in accordance with the invention, comprises a work holder frame 44 and a mounting fram e 46 which is intended to be mounted on a robot arm. The work holder frame 44 comprises parallel spaced apart side plates 48 having rightwardly facing edges 50, as viewed in FIG. 5, to which there is secured a housing positioning fixture 52 by means of screws as shown. The fixture is in the form of a flat plate having a first major surface 54 which is directed leftwardly as viewed in FIG. 5 and a second major surface 56 which is directed rightwardly. A clamping member 58 is spaced from the surface 54 and is movable along an arcuate path relatively towards and away from the surface 54 to clamp the connectors against that surface.

A plurality of terminal guiding openings 60, 60' extend through the fixture 52 from the surface 56 to the surface 54. These openings are arranged in two rows, the upper row in FIG. 6 having openings 60 and the lower row having openings 60'. The lower openings 60 have an open side which extends to the lower edge 62 of the fixture. Each opening has an entrace portion 64 which is inclined inwardly from the surface 56 and which merges with a uniform portion 66 (FIG. 11) which extends normally of, and to, the surface 54. The inclined entrance portions 64 are segmental and are arranged as polygons in partially surrounding relationship to the axes of the openings so that they will correct any slight misorientation of the terminals as they pass therethrough and cause the terminals to have their flat web portions 12 in horizontal planes as they move through the openings and into the cavities in the housings. The disclosed embodiment holds four housings 4 in side-by-side stacked relationship. When the housings are so held against the face 54 of the fixture, the cavities 30, 30' of each housing will be in alignment with a pair 60, 60' of openings.

When a stack of four housings are picked up by the work holder at a loading station, they are moved towards the surface 54 and brought into alignment with the openings 60, 60' by guiding and aligning means which will now be described.

As shown in FIGS. 10-12, ribs 68 extend normally from the surface 54 on each side of each of the openings 60, 60'. The free outer ends of these rigs are tapered to an edge as shown at 70 and each rib has oppositely facing sides 72 which extend normally towards the major surface 54 of the fixture. Gaps are provided in the ribs 68 for the ribs 29 on the sidewalls 26 of the housings as shown in FIG. 5. The sides 72 function as a guiding means which guide the opposite side walls of the housing relatively towards the surface. An aligning means is provided in the form of inclined or obliquely extending surfaces 74 which extend from the side surfaces 72 to the surface 54. These inclined surfaces are precisely located surfaces as will be described below and perform an important function. They are not to be confused with the fillets that are provided in good machining or casting practice for the purpose of avoiding stress concentration in shape corners of a metal part.

Referring to FIGS. 11 and 12, each of the openings 60, 60' has a central axis of symmetry 134. The surfaces 74 on each side of each opening 60 or 60' and the surfaces 72 are located precisely with respect to the axis of symmetry 134 of the associated opening. It should also be explained that the manufacturing specifications for the connectors 4 require that the side walls 26, 26' and their edges at the first face of the housing are located precisely with respect to the central axis of the cavities. By virtue of this relationship, an individual connector housing can be moved towards the surface 54 as shown in FIG. 11 and will be guided along its path by the side surfaces 72 of the ribs 68. As the leading edges 73 of the housing approach the surface 54, they will engage the inclined or obliquely extending surfaces 74 and the axis of the cavity will be brought into substantial coincidence with the axis 134 of the adjacent opeining 60 or 60'. In other words, there may be a slight lateral shifting of the housing during the final stages of its movement to bring about the coincidence of the two axes. The housings 4 must be pushed from the position of FIG. 11 to the position of FIG. 12 at a central location on the second face 24 thereof. As will be explained below, the clamping member 58 does engage each housing at a central location so that the force applied is centrally applied on the mating face.

Figure 3:
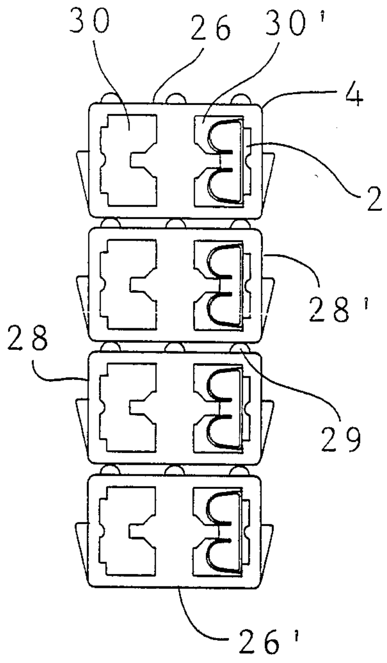
FIGS. 3 and 4 are diagrammatic views which illustrate the necessity for reorienting a stack of connectors during the terminal insertion operations.
Figure 4:
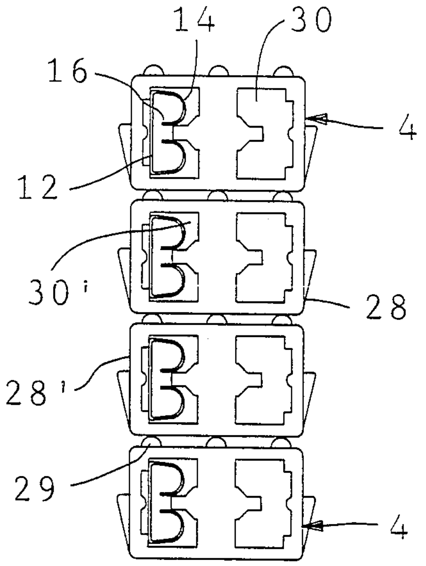
Figure 1:
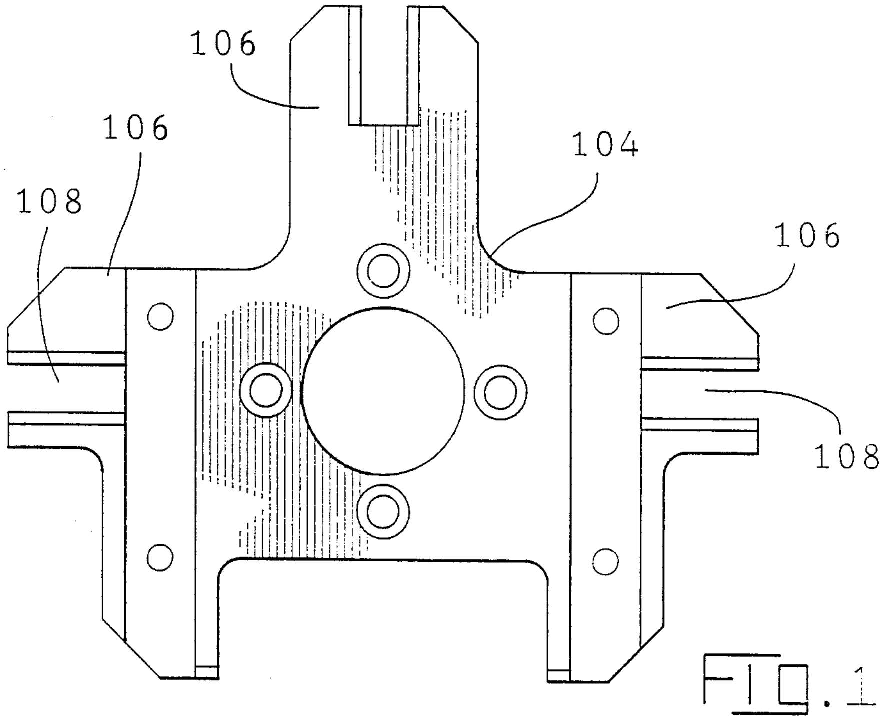

The precise location of the sidewalls 26, 26' with respect to the axis 134 does not include the ribs 29. These ribs 29 are received in gaps in the ribs 68 as priviously mentioned. It should be noted that when four housings are stacked as shown in FIGS. 3 and 4, the opposed sidewalls 26, 26' of adjacent housings in the stack are spaced apart by a distance equal to the height of the ribs 29. The individual housings can, as a result of this spacing, be positioned between the opposed side surfaces of adjacent ribs 68 as shown in FIGS. 11 and 12.

It will be noted in FIG. 12 that when the housing 4 is clamped in the work holder, the first face 22 is not against the first major surface 54; the edges 73 are rather against the inclined surfaces 74.

As also shown in FIG. 12, the width of opening 60 at the surface 54 of the positioning fixture is less than the width of the cavity 30 as measured between the cavity walls 31. This relationship, coupled with the fact that the aligning surfaces 74 are symmetrical with respect to axis 134 of opening 60, ensures that no portion of the first face 22 of the housing will project laterally beyond surfaces 66 of opening 60 and the terminal will be unimpeded during movement into the cavity. The width of opening 60 can be equal to the width or the cavity in an extreme case but must be no greater than the cavity width.

The clamping member 58 is a plate-like member having spaced apart slots which define individual fingers 76, one for each of the housing being clamped. These fingers have centrally located pressure pads 78 which bear against the previously identified flat surface portions 41 which are centrally located on the first face of each housing. An arm 80 extends from the upper edge of the clamping member and is pivotally mounted at 82 on an axis which extends between the plates 48. The upper end of this arm is pivotad at 86 to a toggle link 88 which in turn extends to a pivotal axis 90. A second toggle link 92 extends from the pin 90 to a fixed pivot 94 on the frame plates 48. The toggle mechanism is straightened by means of a piston rod 98 which extends from a piston cylinder 100 supported at its upper end as viewed in FIG. 5 on a pivotal axis 102. It will be apparent from FIG. 5 that pressurization of the piston cylinder 100 with accompanying downward movement of the piston rod 98 will cause the clamping member to move along an arcuate path and thereby clamp the stack of connectors against the face 54 of the fixture.

The spaced apart frame plates 48 are secured by suitable fasteners to one face of a positioning plate 104, FIG. 14, which has three radially extending arms 106 having slots 108 therein. The slots are spaced apart at 90 degree intervals and are adapted to receive a locking dog as will be described below.

Positioning plate 104 is secured to a rotary actuator 110 which in turn is secured to a second rotary actuator 112. Both of these actuators may be of a common type commercially available from Robohand, Inc., P.O. Box 438, Easton, Conn. 06612. The particular actuators shown are both Model RR-16 and are in the form of thin cylinders having rotatable discs on one of their ends. Actuators of this type are capable of 90 degrees of rotation, and two actuators are therefore required to move the work holder assembly between the positions of FIGS. 6 and 9 also to a position in which the fixture and the housings are rotated 90 degrees in a clockwise direction from the position of FIG. 6. The positioning plate is secured to the rotatable disc or flange on the actuator 112. The entire actuator 112 is secured by adaptor plates 114, 116 to the rotable disc of the actuator 112.

The actuator 112 is secured to a back plate 118 which comprises part of the mounting frame. 46. Back plate 118 is fastened to a top plate 120, suitable gussets 122 being provided to rigidify the structure. A piston cylinder 124 is fixed to the underside of top plate 120 and has a licking dog 126 on the end of its piston rod. The piston rod is guided in a guide member 128 which is also on the underside of top plate 120. The purpose of the locking dog 126 is precisely to position the positioning plate 104 after it has been rotated in a manner to bring the stack of connectors into a desired orientation. FIG. 5 shows the positioning dog as spaced from the positioning plate 104 and shows the clamping member 58 in its opening position. Prior to closure of the clamping plate onto a stack of connectors, the dog would be moved leftwardly from its position shown and into one of the slots 108 precisely to locate the clamping member and the fixture 52 relative to the connector stack.

The assembly is intended for mounting on a robot arm 132 and to this end has a locking collar 130 on the upper surface of the top plate 120. Any suitable robot can be used in conjunction with the assembly so long as the robot is capable of the movements described above and as will be described below.

The operation of the work holder is as follows.

It can be assumed that a stack of four connectors has been located at a pick-up station. The work holder is moved by the robot to the pick-up station and positioned with the positioning fixture 52 proximate to, but spaced from, the first faces of the connector housings and with the clamping member 58 spaced from the second faces. The locking dog 126 would then be moved leftwardly from the position shown in FIG. 5 precisely to hold all of the parts in precise positions while the clamping member is moved arcuately to its clamping position by pressurizing the piston cylinder 100. As explained above, as the housings are pushed towards the face of surface 54 of fixture 52, they are individually brought into alignment with the opening 60, 60' by the guiding and aligning surfaces. Thereafter, the robot would move the stack of connectors to an insertion station and swing through a 90 degree arc so as to position one row of cavities adjacent to the insertion mechanism which may be of the type described in the above-identified copending application. Referring to FIG. 3, and assuming the insertion mechanism handles the terminals in the orientations shown in FIG. 3, the terminals in the orentations shown in FIG. 3, the terminals would be successively inserted into one cavity in each connector. The indexing would be carried out by the robot which is capable of incremental movements. Because of the orientation difference between the cavities on the right and the cavities on the left in FIGS. 3 and 4, the fixture frame would then be rotated in a clockwise direction so that the cavities on the right and left hand sides would change places. The insertion mechanism can now insert terminals into the row of cavities 30 shown in FIG. 4. Obviously, the entire stack of connectors must be displaced laterally in one direction or another when the operation of reorienting the stack is carried out. This again can be carried out by the robot.

It will be apparent from the foregoing that a work holder has been described which, in conujunction with a robot, permits a high degree of flexibility in positioning electrical connectors adjacent to an insertion mechanism so that terminals can be inserted into the cavities in the connector. The disclosed embodiment is intended to hold four connectors, each of which has two cavities, however, alternative embodiments can be designed for other types of connectors and for single connectors having more than two cavities therein.

I claim:

1. A work holder for holding an electrical connector housing during insertion of terminals into terminal receiving cavities in the housing, the housing having oppositely directed first and second faces, the terminal receiving cavities extending inwardly from the first face, the work holder comprising:

a housing positioning fixture having oppositely directed first and second major fixture surfaces, a plurality of terminal guiding openings extending through the positioning fixture at locations conforming to the locations of the cavities in the housing, a clamping member located in spaced aligned relationship to the first major fixture surface, the clamping member and the positioning fixture being movable relatively towards and away from each other between open and closed positions, the clamping member and the positioning fixture being spaced apart by a distance sufficient to permit placement of the housing therebetween with the first face of the housing opposed to the first major fixture surface when the fixture and the clamping member are in their open positions, the housing being clamped between the clamping member and the positioning fixture with the first face adjacent to the first major fixture surface when the clamping member and the positioning fixture are in their closed positions, clamp actuating means for moving the positioning member and the clamping fixture between their open and closed positions, and guiding and aligning means on the first major fixture surface of the positioning fixture, the guiding and aligning means having surface portions which engage portions of the housing, during movement of the fixture and the clamping member to their closed positions, and which align the cavities with the terminal guiding openings whereby, upon placement of the housing between the positioning fixture and the clamping member with the cavities in approximate alignment with the terminal guiding openings when the positioning fixture and the clamping member are in their open positions, and thereafter moving the positioning fixture and the clamping member to their closed positions, the guiding and aligning means will cause the housing to be guided towards the first major fixture surface and the cavities will be brought into precise alignment with the terminal guiding openings.

2. A work holder as set forth in claim 1 characterized in that the clamping member comprises a plate-like member which is against the second face of the housing when the clamping member and the positioning fixture are in their closed positions.

3. A work holder as set forth in claim 1 characterized in that the guiding and aligning means comprises guiding surface portions and aligning surface portions, the guiding surface portions extending from the first major fixture surface and being effective initially to guide the housing towards the first major fixture surface, the aligning surface portions extending obliquely from the first major fixture to the surface to the guiding surface portions and being effective precisely to align the cavities with the terminal guiding opening by shifting the housing laterally with respect to the first major fixture surface.

4. A work holder as set forth in claim 3, the connector housing having external walls which extend from the first face to the second face, the housing having housing edges at the intersections of the first face and the external walls, the work holder being characterized in that the housing edges are moved against the obliquely extending aligning surface portions of the aligning means by the clamping member during movement of the positioning fixture and the clamping member to their closed positions.

5. A work holder as set forth in claim 4 characterized in that the guiding surface portions extend normally of the first major fixture surface.

6. A work holder as set forth in claim 4 characterized in that each of the terminal guiding openings has a guiding opening axis which extends normally of the first major fixture surface, the guiding and aligning surface portions being on opposite sides of the terminal guiding openings axes in the positioning fixture and being symmetrically located with respect thereto.

7. A work holder as set forth in claim 6 characterized in that the clamping member has a bearing portion which is against the second face of the housing when the housing is clamped in the work holder, the bearing portion being against the second face at a central location thereon.

8. A work holder as set forth in eitherr of claims 1 or 7 characterized in that each of the terminal guiding openings has transverse dimensions at the first major fixture surface which are substantially equal to, and no greater than, the transverse dimensions of the cavities whereby, edge portions of the cavities at the first face of the housing do not project into the path of movement of a terminal during insertion of the terminal through an associated terminal guiding opening and into cavity.

9. A work holder as set forth in claim 8 characterized in that each of the guiding openings has an entrance portion extending inwardly from the second major fixture surface, the entrance portions having transverse dimensions which are greater than the transverse dimensions at the first major fixture surface, the entrance portions having inclined surface portions extending inwardly from the second major fixture surface towards the first major fixture surface.

10. A work holder as set forth in claim 8 characterized in that the work holder is capable of holding a plurality of connectors in stacked side-by-side relationship, the first major fixture surface having guiding and aligning means for each of the connectors.

11. A work holder as set forth in claim 7 characterized in that when the work holder has a housing clamped therein, the first face of the housing 15 spaced from the first major surface of the positioning fixture, and portions of the housing edges are against the obliquely extending surface portions of the aligning means.

12. A work holder as set forth in claim 1 characterized in that the work holder has a work holder frame, the housing positioning fixture and the clamping member being movably mounted on the work holder frame, and the positioning fixture being fixed to the work holder frame.

13. A work holder as set forth in claim 12 characterized in that the clamp actuating means is mounted on the work holder frame and is coupled to the clamping member.

14. A work holder as set forth in claim 13 characterized in that work holder is part of a work holder assembly which is intended for mounting on a robot, the work holder assembly comprising the work holder frame and a mounting frame, the mounting frame having means for securing the work holder assembly to the robot.

15. A work holder as set forth in claim 14 characterized in that the mounting frame has a rotary actuator thereon, the work holder frame being mounted on the rotary actuator thereby to permit rotation of the work holder for orientation purposes.

16. A work holder for holding an electrical connector housing during insertion of terminals into terminal receiving cavities in the housing, the housing having oppositely directed first and second faces, the terminal receiving cavities extending inwardly from the first face, the work holder comprising:

a housing positioning fixture comprising a plate-like member having oppositely directed first and second major fixture surfaces, a plurality of terminal guiding openings extending through the positioning fixture at locations conforming to the locations of the cavities in the housing, a clamping member located in spaced aligned relationship to the first major fixture surface, the clamping member and the positioning fixture being movable relatively towards and away from each other between open and closed positions, the clamping member and the positioning fixture being spaced apart by a distance sufficient to permit placement of the housing therebetween with the first face opposed to the first major fixture surface when the fixture and the clamping member are in their open positions, the housing being clamped between the clamping member and the positioning fixture with the first face adjacent to the first major fixture surface when the clamping member and the positioning fixture are in their closed positions, clamp actuating means for moving the positioning member and the clamping fixture between their open and closed positions, guiding and aligning means on the first major fixture surface of the positioning fixture, the guiding and aligning means comprising guiding surface portions and aligning surface portions, the guiding surface portions extending from the first major fixture surfae and being effective initially to guide the housing towards the first major fixture surface, the aligning surface portions extending obliquely from the first major fixture to the surface to the guiding surface portions and being effective precisely to align the cavities with the terminal guiding opening by shifting the housing laterally with respect to the first major fixture surface, the connector housing having external walls which extend from the first face to the second face, the housing having housing edges at the intersections of the first face and the external walls, the housing edges being moved against the obliquely extending aligning surface portions of the aligning means during movement of the positioning fixture and the clamping member to their closed positions, each of the terminal guiding openings has a guiding opening axis which extends normally of the first major fixture surface, the guiding and aligning surface portions being on opposite sides of the terminal guiding openings axes in the positioning fixture and being symmetrically located with respect thereto, the work holder being part of a work holder assembly which is intended for mounting on a robot, the work holder assembly comprising a work holder frame and a mounting frame, the mounting frame having means for securing the work holder assembly to the robot, the mounting frame having a rotary actuator thereon, the work holder frame being mounted on the rotary actuator thereby to permit rotation of the work holder for orientation purposes.

* * * * *

UNITED STATES PATENT OFFICE
CERTIFICATE OF CORRECTION

Patent No. 4,837,926 Dated June 13, 1989

Inventor(s) Andrew G. Boutcher, Jr.

It is certified that error appears in the above-identified patent and that said Letters Patent is hereby corrected as shown below:

Column 8, claim 8, line 55, change "eitherr" to --either--.

Column 8, claim 8, line 63, insert --a-- before "cavity".

Column 9, claim 11, line 12, change "15" to --is--.

Column 9, claim 14, line 28, after "that" add --the--.

Column 10, claim 16, line 20, change "surfae" to --surface--.

Column 9, claim 12, line 20, after "being" add --carried by the work holder frame, the clamping member being--

Signed and Sealed this

Thirteenth Day of March, 1990

*Attest:*

JEFFREY M. SAMUELS

*Attesting Officer*

*Acting Commissioner of Patents and Trademarks*